(12) United States Patent
Nakamura

(10) Patent No.: US 6,671,750 B2
(45) Date of Patent: Dec. 30, 2003

(54) LAN INTERFACE

(75) Inventor: Koichi Nakamura, Gunma (JP)

(73) Assignee: NEC Corporation, Tokyo (JP)

(*) Notice: Subject to any disclaimer, the term of this patent is extended or adjusted under 35 U.S.C. 154(b) by 368 days.

(21) Appl. No.: 09/820,220

(22) Filed: Mar. 29, 2001

(65) Prior Publication Data
US 2001/0027531 A1 Oct. 4, 2001

(30) Foreign Application Priority Data
Mar. 31, 2000 (JP) ......................................... 2000-097042

(51) Int. Cl.[7] .................................................. G06F 3/00
(52) U.S. Cl. ........................... 710/18; 710/33; 710/107; 709/223; 709/238
(58) Field of Search ........................... 710/1, 5, 11, 12, 710/14, 15, 18, 19, 31, 33, 107, 112; 709/223, 224, 238, 236

(56) References Cited

U.S. PATENT DOCUMENTS

| 4,903,338 A | * | 2/1990 | Funke ........................ 455/607 |
| 5,136,580 A | * | 8/1992 | Videlock et al. .............. 370/60 |
| 5,555,277 A | * | 9/1996 | Lawrence et al. .......... 375/346 |
| 5,901,136 A | * | 5/1999 | Lovelace et al. ........... 370/217 |
| 5,935,249 A | * | 8/1999 | Stern et al. ................. 713/201 |
| 6,061,768 A | * | 5/2000 | Kuo et al. ................... 711/156 |
| 6,290,131 B1 | * | 9/2001 | Kolis et al. .............. 235/462.01 |

FOREIGN PATENT DOCUMENTS

| JP | 05-14359 A | 1/1993 |
| JP | 10-93609 A | 4/1998 |
| JP | 11-88352 A | 3/1999 |

* cited by examiner

Primary Examiner—Jeffrey Gaffin
Assistant Examiner—Rijue Mai
(74) Attorney, Agent, or Firm—Sughrue Mion, PLLC

(57) ABSTRACT

A LAN interface is provided that can reduce the power consumption of the whole of a terminal in an unnecessary state of a LAN interface. The LAN interface includes a link pulse detector 16 that operates on a predetermined voltage supplied via the I/O bus 11 and detects a link pulse transmitted from a counter device connected to the connection port 15. When detecting a link pulse sent from a counter device, the link pulse detector 16 controls the LAN controller 13 and the isolation section 12 to controllably bring them to an operation state thereof. When not detecting a link pulse sent from the counter device, the link controller 13 controls the LAN controller 13 and the isolation section 12 to bring them to a non-operation state.

10 Claims, 4 Drawing Sheets

LAN INTERFACE

BACKGROUND OF THE INVENTION

The present invention relates to a LAN interface. Particularly, the present invention relates to a LAN interface capable of reducing power consumption.

Recently, PC terminals, which have LAN interface functions as standard equipment, have been increasingly used for business users. However, some users may not always use the LAN connection. When a notebook-type personal computer (PC) is used outdoors, the case where the LAN function is not totally used occurs often. With the LAN interface attached, there is the problem that the battery power is wastefully consumed even in an idle state of the LAN interface. In the case of removal of the LAN interface, it is relatively easy to disconnect the PC card from the PC body. However, it is difficult or impossible to physically remove the LAN interface from the motherboard. Moreover, the problem is that every time the user goes out with the notebook-type PC, it has to be repeated to attach and detach the LAN interface to and from it.

SUMMARY OF THE INVENTION

The present invention is made to solve the abovementioned problems. An objective of the present invention is to provide a novel LAN interface capable of reducing the whole power consumption of a terminal at the time an LAN interface is not required.

In order to achieve the objective of the present invention, a LAN interface comprises a terminal connected to an I/O bus and a counter device connected to connection ports of the LAN interface. The LAN interface is connected to the I/O bus and transmitting and receiving a link pulse to confirm connection between the terminal and the counter device. The LAN interface includes a LAN controller for processing a signal transmitted from the terminal and then transmitting a processed signal to the counter device, and for processing a signal transmitted from the counter device and then transmitting a processed signal to the connection device; an isolation section connected between the LAN controller and the I/O bus, for electrically disconnecting the LAN controller from the I/O bus; an analog circuit connected between the LAN controller and the connection port, for subjecting a transmission signal and a received signal to an analog process; and a link pulse detector for operating on a predetermined voltage supplied via the I/O bus and detecting a link pulse from the counter device connected to the connection port. The link pulse detector, when detecting a link pulse output from the counter device, controls the LAN controller and the isolation section to controllably bring them to an operation state thereof. The link pulse detector, when not detecting a link pulse output from the counter device, controls the LAN controller and the isolation section to controllably bring them to a non-operation state.

In the LAN interface, the link pulse detector controls the power source potential of the LAN controller and the power source potential of the isolation section.

In the LAN interface, the link pulse comprises a signal on the basis of the IEEE 802.3 standards.

In another aspect of the invention, a LAN interface comprises a terminal connected to an I/O bus. The LAN interface is connected to the I/O bus. The LAN interface includes a LAN controller for processing a signal transmitted from the terminal and then transmitting a processed signal to a counter device, and for processing a signal transmitted from the counter device and then transmitting a processed signal to the connection device; an isolation section connected between the LAN controller and the I/O bus, for electrically disconnecting the LAN controller from the I/O bus; an analog circuit connected between the LAN controller and the connection port, for subjecting a transmission signal and a received signal to an analog process; and a frame detector for operating on a predetermined voltage supplied via the I/O bus and detecting the presence or absence of a frame, based on a signal from the counter device connected to the connection port. The frame detector, when detecting a frame, controls the LAN controller and the isolation section to controllably bring them to an operation state thereof. The frame detector, when not detecting a frame, controls the LAN controller and the isolation section to controllably bring them to a non-operation state.

In the LAN interface, the frame detector controls the power source potential of the LAN controller and the power source potential of the isolation section.

In further another aspect of the invention, a LAN interface comprises a LAN controller for processing a signal transmitted from a terminal connected to an I/O bus and then transmitting a processed signal to the counter device, and for processing a signal transmitted from the counter device and then transmitting a processed signal to the connection device; a separator connected between the LAN controller and the I/O bus, for electrically disconnecting the LAN controller from the I/O bus; and a link pulse detector for operating on a predetermined voltage supplied via the I/O bus and detecting a link pulse from the counter device connected to the connection port. The link pulse detector, when detecting a link pulse output from the counter device, controls the LAN controller and the isolation section to controllably bring them to an operation state thereof. The link pulse detector, when not detecting a link pulse output from the counter device, controls the LAN controller and the isolation section to controllably bring them to a non-operation state.

In the LAN interface, the link pulse detector controls the power source potential of the LAN controller and the power source potential of the isolation section. In the LAN interface, the link pulse comprises a signal on the basis of the IEEE 802.3 standards.

In still another aspect of the invention, a LAN interface comprises a LAN controller for processing a signal transmitted from a terminal connected to an I/O bus and then transmitting a processed signal to the counter device, and for processing a signal transmitted from the counter device and then transmitting a processed signal to the connection device; a separator connected between the LAN controller and the I/O bus, for electrically disconnecting the LAN controller from said I/O bus; and a frame detector for operating on a predetermined voltage supplied via the I/O bus and detecting the presence or absence of a frame based on a signal from the counter device connected to the connection port. The frame detector, when detecting a frame, controls the LAN controller and the isolation section to controllably bring them to an operation state thereof. The frame detector, when not detecting a frame, controls the LAN controller and the isolation section to controllably bring them to a non-operation state.

In the LAN interface, the frame detector controls the power source potential of the LAN controller and the power source potential of the isolation section.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

A LAN interface according to the present invention relates a LAN interface used for an information processing terminal such as a personal computer to configure a local area network (LAN) such as 10BASE-T or 100BASE-TX in compliance with the IEEE 802.3 standard, using shield-less twisted pair cables as transmission media. The LAN interface has the function of monitoring at all times a link pulse signal which confirms physical and electrical connection between segments defined by the IEEE 802.3 on a normally energizing power source. The LAN interface further has the function of controllably supplying the drive power source to the LAN controller based on the presence or absence of the link pulse signal. Moreover, the LAN interface has the function of controllably isolating the I/O bus from the LAN controller.

Figure 1:
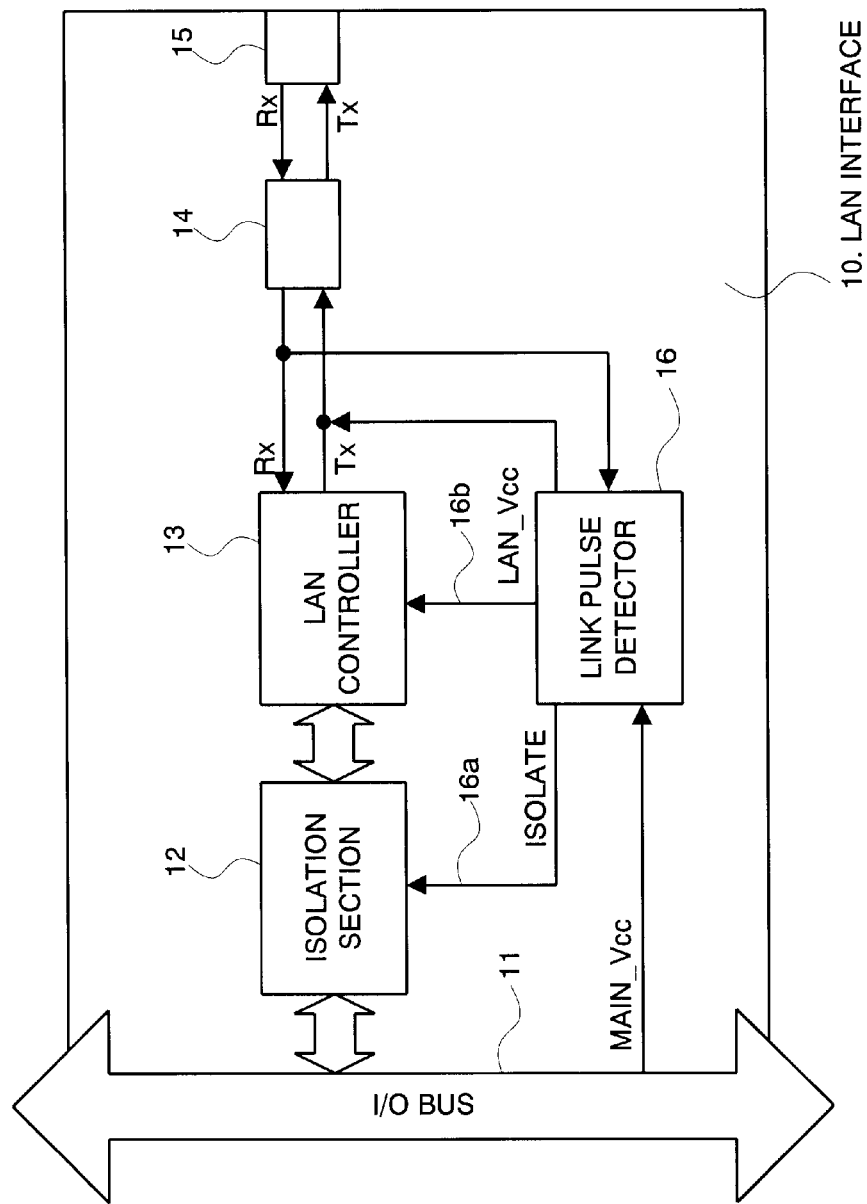
FIG. 1 is a block diagram illustrating a LAN interface according to a first embodiment of the present invention.

Referring to FIG. 1, a link pulse signal received on a received signal Rx is transmitted from a counter device (e.g., a terminal or HUB) via the LAN cable with a fixed period (25 to 50 ms). A link pulse detector 16, which operates on a normally energizing power source (Main_Voo), monitors the presence or absence of the link pulse signal at all times. Thus, the link pulse detector 16 automatically controls the operation of the isolation section 12 and the supply of the drive power source (LAN_Vcc) to the LAN controller 13.

According to the presence or absence of a link pulse, or the presence or absence of connection between the LAN and the terminal, the link pulse detector 16 can automatically control the supply of the drive power source for the LAN controller as well as connection/disconnection of the I/O bus. Hence, when a terminal is not connected to a LAN, that is, the LAN interface is unnecessary, the power consumption of the whole of the terminal can be reduced. In this case, the resources (memory space, IO space, interrupt channel, and so on) of the terminal can be automatically opened.

Semiconductor devices according to embodiments of the present invention will be described below in detail with reference to the attached drawings.

First Embodiment

Figure 2:
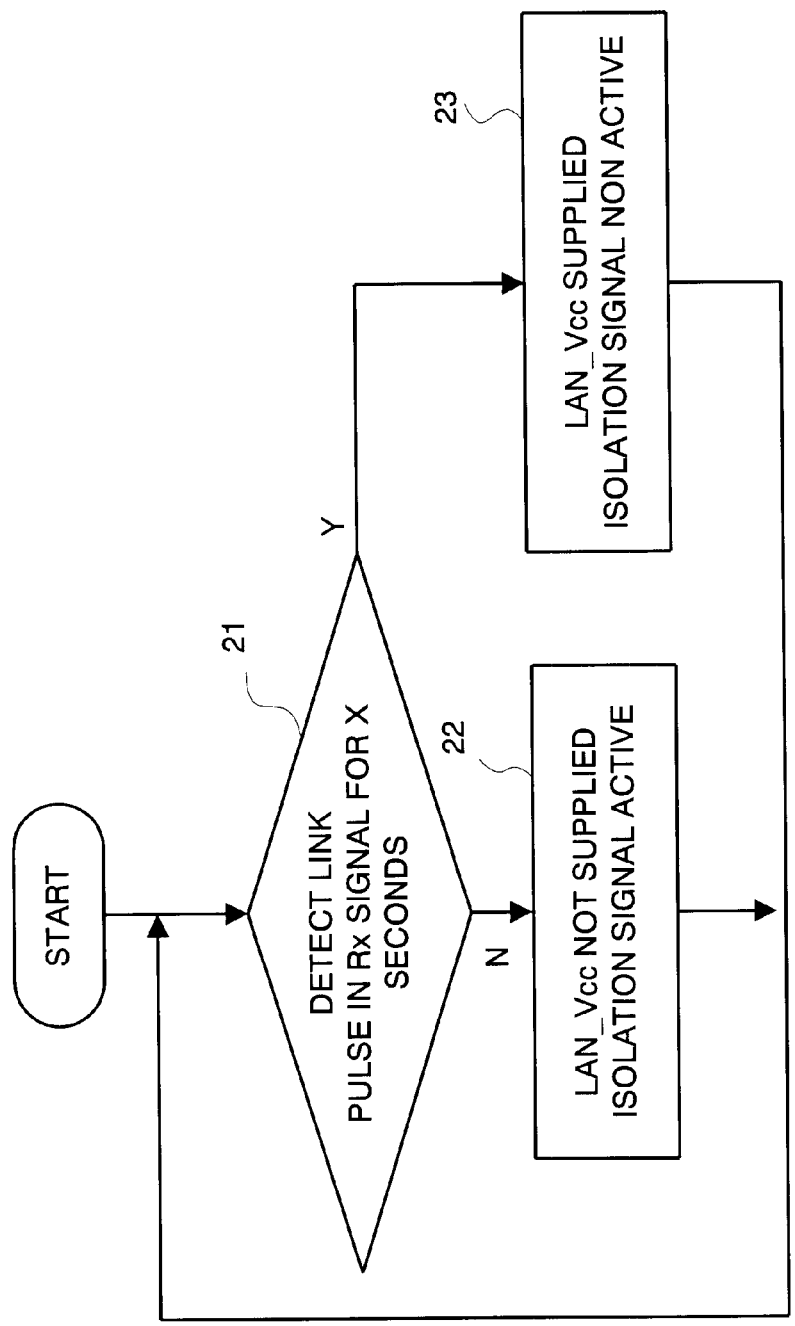
FIG. 2 is a flowchart of the first embodiment.
Figure 3:
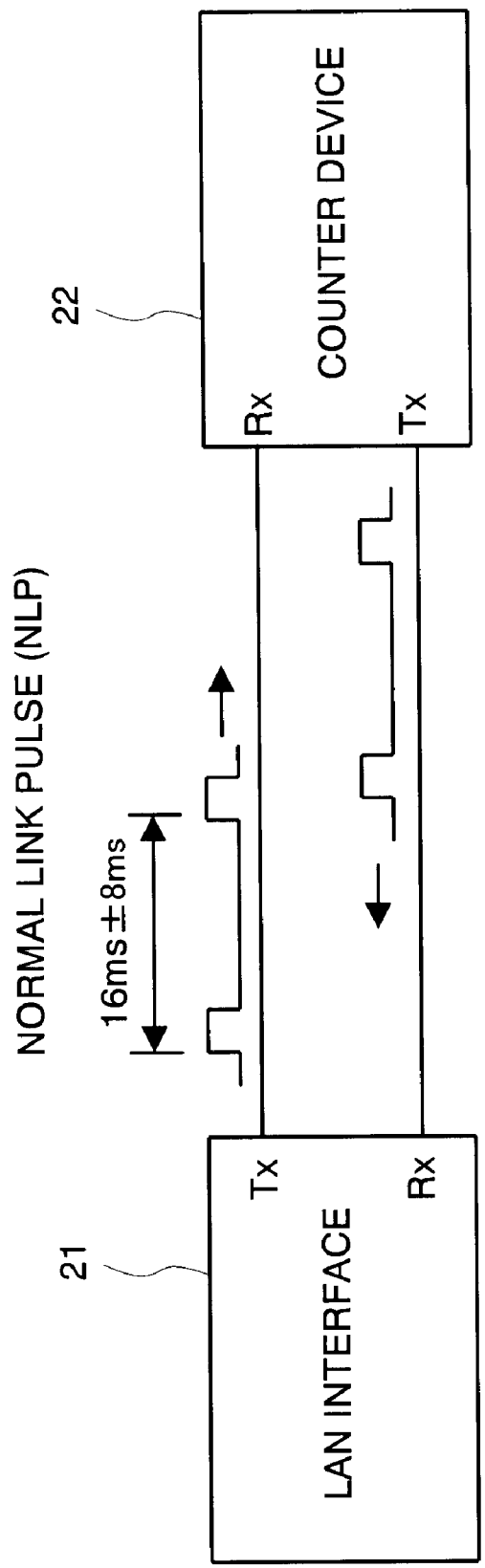
FIG. 3 is an explanatory diagram explaining a normal link pulse transmission function defined in IEEE 802.3 standard for confirmation of mutual connection between a terminal and a counter device.

A LAN interface according to a first embodiment will be explained below by referring to the FIGS. 1 to 3. FIG. 1 is a block diagram illustrating a LAN interface according to the first embodiment of the present invention. FIG. 2 is a flowchart of the first embodiment. FIG. 3 is an explanatory diagram explaining a normal link pulse transmission function defined in IEEE 802.3 standard for confirmation of mutual connection between a terminal and a counter device.

Referring to FIGS. 1 to 3, the system consists of a terminal, a LAN interface 10, and a counter device. The terminal is connected to the I/O bus 11. The LAN interface 10 is connected to the I/O bus 11. The counter device is connected to the connection port 15 of the LAN interface 10. The LAN interface 10 transmits and receives a link pulse to confirm connection between the terminal and the counter device.

The LAN interface includes a LAN controller 13 for processing a signal transmitted from the terminal and then transmitting a processed signal to the counter device, and for processing a signal transmitted from the connection device and then transmitting a processed signal to the counter device; an isolation section 12 connected between the LAN controller 13 and the I/O bus 11, for electrically disconnecting the LAN controller 13 from the I/O bus 11; an analog circuit 14 connected between the LAN controller 13 and the connection port 15, for subjecting a transmission signal and a received signal to an analog process; and a link pulse detector 16 for operating on a predetermined voltage supplied via the I/O bus 11 and detecting a link pulse from the counter device connected to the connection port 15. The link pulse detector 16, when detecting a link pulse output from the counter device, controls the LAN controller 13 and the isolation section 12 to controllably bring them to an operation state thereof. The link pulse detector 16, when not detecting a link pulse output from the counter device, controls the LAN controller 13 and the isolation section 12 to controllably bring them to an operation state.

The first embodiment will be explained below in more detail.

The terminal 21 or the counter device 22 (wiring device such as multiport repeater), connected to the LAN such as 10BASE-T or 100BASE-TX in compliance with the IEEE 802.3 standard, as shown in FIG. 3, transmit a link pulse signal (a normal link pulse) which confirms mutual physical connection. Thus, each device detects a link pulse signal from the counter device to confirm establishment of physical connection. Therefore, it can be confirmed whether or not either device has been physically connected to the LAN by detecting the presence or absence of the link pulse signal.

When the power source for a terminal itself is turned on, the link pulse detector 16 receives Main_Vcc (5 volts dc) via the I/O bus 11. The link pulse detector 16 checks whether or not the received signal Rx has a link pulse for the time period (x seconds, for example, 24 ms (=16+8) or more) sufficient to detect the pulse signal (step S21 in FIG. 2). When a link pulse signal is not detected in the received signal Rx, it is judged that the terminal is not connected to the LAN. Then, the drive power source LAN_Vcc is not supplied to the LAN controller 13 while the Isolate signal 16a to the isolation section 12 becomes active (step S22 in FIG. 2). Since the drive power source LAN_Vcc is not supplied, the LAN controller 13 cannot totally operate and does not consume any electric power. The isolation section 12 makes the Isolate signal 16a active to electrically disconnect the I/O bus 11 from the LAN controller 13. Hence, when the LAN interface 10 is viewed from the terminal, it is regarded that the LAN interface 10 itself does not exist in the terminal so that the resources (memory space, IO space, interrupt channel, and so on) of the terminal are not allocated.

On the other hand, the link pulse detector 16 confirms the presence or absence of a link pulse signal on the received signal Rx for a fixed time period (step S21 in FIG. 2). When detecting the link pulse signal in the received signal Rx, the link pulse detector 16 judges that the terminal is connected to the LAN. Then, the link pulse detector 16 supplies the drive power source LAN_Vcc to the LAN controller 13 and makes the isolation signal 16a to the isolation section 12 NonActive (step S23 in FIG. 2). In response to the supply of the drive power source LAN_Vcc, the LAN controller 13 becomes an operable state. Since the isolation signal 16a is made NonActive, the isolation section 12 electrically connects the I/O bus 11 to the LAN controller 13. Hence, when the LAN interface 10 is viewed from the terminal, the terminal detects the presence of the LAN interface 10 and the resources (memory space, IO space, interrupt channel and so on) of the terminal is allocated to the LAN interface 10. Thus, the LAN interface 10 becomes operable as a LAN interface of the terminal.

A signal of controlling the power potential of the isolation section 12 may be used as the Isolate signal 16a. Any control signal that disconnects the isolation section 12 from the I/O bus 11 may be used as the Isolate signal 16a. The control signal which matches the circuit configuration, if necessary, may be created as the Isolate signal 16a.

Second Embodiment

Figure 4:
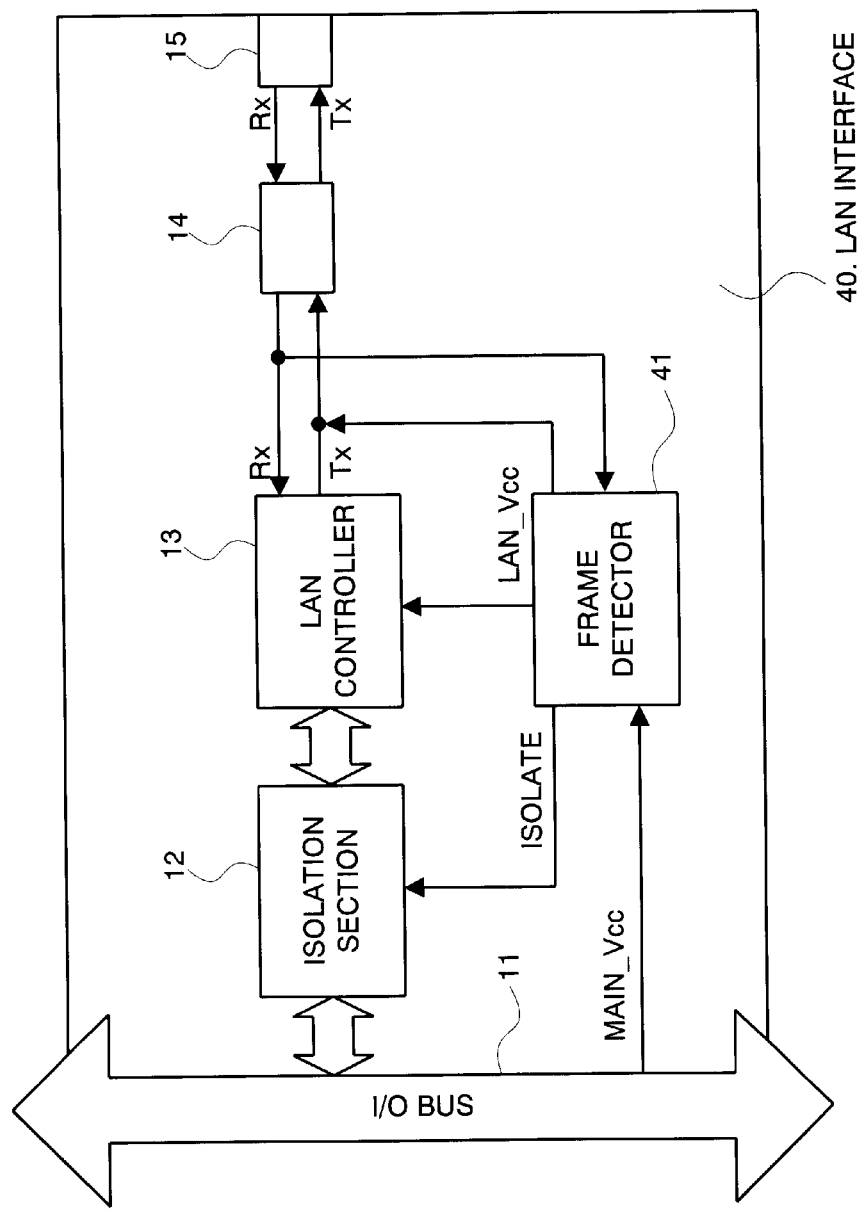
FIG. 4 is a block diagram illustrating a LAN interface according to a second embodiment of the present invention.

A LAN interface according to a second embodiment of the present invention will be explained below in detail by referring to FIG. 4.

In the LAN interface of the second embodiment, a frame detector 41 is used in place of the link pulse detector 16 in FIG. 1. The frame detector 41 monitors the received signal Rx for a fixed time period to detect the presence or absence of an actual frame on the LAN. The frame detector 41 implements supply control of LAN_Vcc and output control of the isolation signal based on the presence or absence of the frame and then automatically judges and controls the state of the LAN connection.

This embodiment captures all frames of data on the LAN, regardless of broadcast and uni-cast, in a similar manner to that of the LAN analyzer measuring equipment. Thus, there is the new advantage in that the present embodiment can monitor the state of LAN connection and can control the LAN interface.

In the LAN interface with the above-mentioned configuration according to the present invention, when the terminal is not connected to the LAN, that is, the LAN interface is unnecessary, the power consumption of the whole of the LAN interface can be largely reduced.

The present invention has an excellent effect in that the resources (memory space, 10 space, interrupt channel and so on) of a terminal can be automatically opened without physically disconnecting the LAN interface from the terminal.

The entire disclosure of Japanese Application No. 2000-097042 filed on Mar. 31, 2000 including specification, claims, drawings and summary are incorporated herein by reference in its entirely.

What is claimed is:

1. A LAN interface comprising:
   a terminal connected to an I/O bus; and
   a counter device connected to connection ports of said LAN interface;
   said LAN interface being connected to said I/O bus and transmitting and receiving a link pulse to confirm connection between said terminal and said counter device;
   said LAN interface including:
      a LAN controller for processing a signal transmitted from said terminal and then transmitting a processed signal to said counter device, and for processing a signal transmitted from said counter device and then transmitting a processed signal to said connection device;
      an isolation section connected between said LAN controller and said I/O bus, for electrically disconnecting said LAN controller from said I/O bus;
      an analog circuit connected between said LAN controller and said connection port, for subjecting a transmission signal and a received signal to an analog process; and
      a link pulse detector for operating on a predetermined voltage supplied via said I/O bus and detecting a link pulse from said counter device connected to said connection port;
      wherein said link pulse detector, when detecting a link pulse output from the counter device, controls the LAN controller and the isolation section to controllably bring them to an operation state thereof and, when not detecting a link pulse output from the counter device, controls the LAN controller and the isolation section to controllably bring them to a non-operation state.

2. The LAN interface defined in claim 1, wherein said link pulse detector controls the power source potential of said LAN controller and the power source potential of said isolation section.

3. The LAN interface defined in claim 1, wherein said link pulse comprises a signal on the basis of the IEEE 802.3 standards.

4. A LAN interface comprising:
   a terminal connected to an I/O bus;
   said LAN interface being connected to said I/O bus;
   said LAN interface including:
      a LAN controller for processing a signal transmitted from said terminal and then transmitting a processed signal to a counter device, and for processing a signal transmitted from said counter device and then transmitting a processed signal to said connection device;
      an isolation section connected between said LAN controller and said I/O bus, for electrically disconnecting said LAN controller from said I/O bus;
      an analog circuit connected between said LAN controller and said connection port, for subjecting a transmission signal and a received signal to an analog process; and
      a frame detector for operating on a predetermined voltage supplied via said I/O bus and detecting the presence or absence of a frame, based on a signal from said counter device connected to said connection port;
      wherein said frame detector, when detecting a frame, controls the LAN controller and the isolation section to controllably bring them to an operation state thereof and, when not detecting a frame, controls the LAN controller and the isolation section to controllably bring them to a non-operation state.

5. The LAN interface defined in claim 4, wherein said frame detector controls the power source potential of said LAN controller and the power source potential of said isolation section.

6. A LAN interface comprising:
   a LAN controller for processing a signal transmitted from a terminal connected to an I/O bus and then transmitting a processed signal to said counter device, and for processing a signal transmitted from said counter device and then transmitting a processed signal to said connection device;
   a separator connected between said LAN controller and said I/O bus, for electrically disconnecting said LAN controller from said I/O bus; and
   a link pulse detector for operating on a predetermined voltage supplied via said I/O bus and detecting a link pulse from said counter device connected to said connection port;

wherein said link pulse detector, when detecting a link pulse output from the counter device, controls the LAN controller and the isolation section to controllably bring them to an operation state thereof and, when not detecting a link pulse output from the counter device, controls the LAN controller and the isolation section to controllably bring them to a non-operation state.

7. The LAN interface defined in claim 4, wherein said link pulse detector controls the power source potential of said LAN controller and the power source potential of said isolation section.

8. The LAN interface defined in claim 6, wherein said link pulse comprises a signal on the basis of the IEEE 802.3 standards.

9. A LAN interface comprising:

a LAN controller for processing a signal transmitted from a terminal connected to an I/O bus and then transmitting a processed signal to said counter device, and for processing a signal transmitted from said counter device and then transmitting a processed signal to said connection device;

a separator connected between said LAN controller and said I/O bus, for electrically disconnecting said LAN controller from said I/O bus; and a frame detector for operating on a predetermined voltage supplied via said I/O bus and detecting the presence or absence of a frame based on a signal from said counter device connected to said connection port;

wherein said frame detector, when detecting a frame, controls the LAN controller and the isolation section to controllably bring them to an operation state thereof and, when not detecting a frame, controls the LAN controller and the isolation section to controllably bring them to a non-operation state.

10. The LAN interface defined in claim 9, wherein said frame detector controls the power source potential of said LAN controller and the power source potential of said isolation section.

* * * * *